United States Patent [19]

Kojima

[11] 3,844,007
[45] Oct. 29, 1974

[54] WELD BEAD REMOVING APPARATUS
[76] Inventor: Jiro Kojima, No. 40-24 Honcho 5-chome, Tokyo, Japan
[22] Filed: Nov. 8, 1972
[21] Appl. No.: 304,637

[30] Foreign Application Priority Data
Nov. 11, 1971   Japan................................. 46-89404

[52] U.S. Cl...................... 29/33 A, 90/18, 90/24 B, 90/DIG. 8
[51] Int. Cl.............................................. B23c 3/00
[58] Field of Search.......... 90/18, 11 R, 12 R, 24 B, 90/DIG. 8; 29/33 A, 33 D, 33 T

[56] References Cited
UNITED STATES PATENTS
2,053,831   9/1936   Jenkins................................. 90/24
2,354,289   7/1944   Babb..................................... 90/18
2,377,271   5/1945   Schumann........................... 90/12 X
3,618,463   11/1971  Briney et al. ....................... 90/11 X Primary Examiner—Gil Weidenfeld
Attorney, Agent, or Firm—Toren, McGeady & Stanger

[57] ABSTRACT

An apparatus for continuously removing a weld bead from the inner surface of a welded metallic tube, providing a rotary cutter arranged in the vicinity of the welding point of the tube, a rotary shaft carrying the rotary cutter at its free end, driving means for rotating the rotary shaft and resilient means to press the rotary cutter against the inner wall of the tube. The rotary cutter is rotated at a high speed and cooled by water so that it is kept in a cooled condition while removing the weld bead.

5 Claims, 4 Drawing Figures

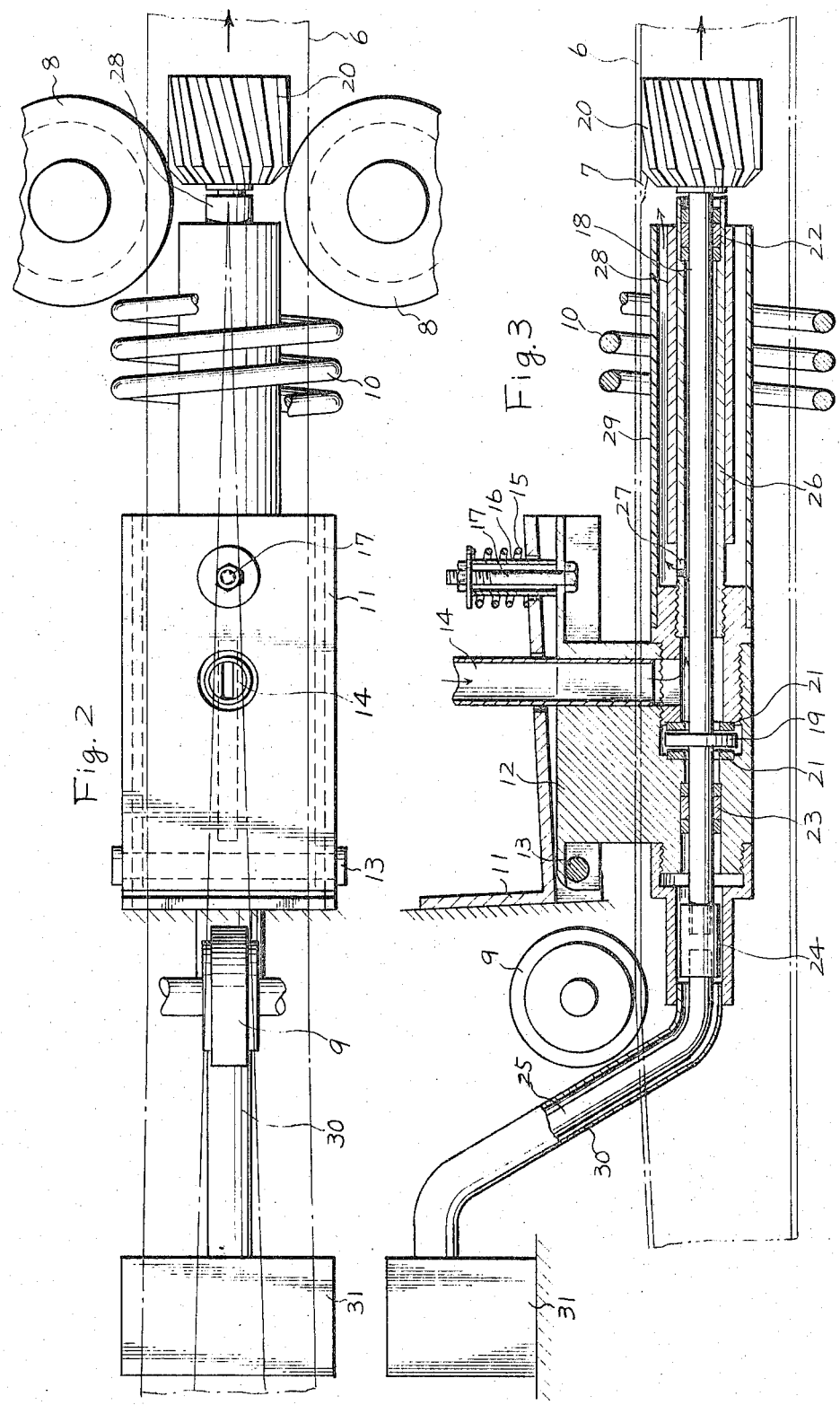

WELD BEAD REMOVING APPARATUS

This invention relates to an apparatus for removing a weld bead from the inner surface of a continuously welded metallic tube.

Generally, the internal weld bead of a continuously welded metallic tube which is produced by forming a metallic strip cylindrically and welding both its edges with high frequency resistance welding method, high frequency induction welding method, and the like, disturbs the smooth flowing of fluid, the smooth insertion of electric wire or the operation of tube bending. Thus there exists a serious demand for means to remove the internal weld bead of welded tubes.

To meet the above mentioned demand, hitherto known apparatus with a stationary cutting tool were employed. As shown in FIG. 1, these apparatus are provided with a tool holder 3, a cutting tool 4 and a fixing rod 5. The welded tube 1 continuously proceeds in the direction of the arrow. The cutting tool 4 is situated several feet from the welding point and continuously removes the internal weld bead 2 which is squeezed out at the welding point. These apparatus have the following defects:

1. The cutting tool cuts the internal weld bead at a cooled down state, therefore the cutting resistance is great and has the tendency to be torn off the fixing means.
2. The height of the edge of this cutting tool cannot be controlled while it is working, hence undercutting or overcutting of the weld bead frequently occurs.
3. The available period of the cutting tool is very short, resulting from the over heating of the edge and the shock due to the start and stop of the tube mill.

When using these apparatus, frequent exchange of the cutting tool is necessary, due to the short available cutting period. Moreover, the tube has to be cut when exchanging the cutting tool. Therefore, there occurs a poor working ratio of the tube mill and the loss of raw material. The shortness of the available period of the cutting tool is influencial to the cost of the product and a fatal defect of these apparatus.

The object of this invention is to provide means for removing the internal weld bead of the welded metallic tube which has a several hundred times longer available cutting period than the heretofore used means.

More particularly, this invention provides a means which has a rotary cutter, instead of the heretofore used stationary cutting tool and efficiently removes the internal bead at the welding point or its vicinity while the internal weld bead is still in a state of high temperature near the melting point of the metal. On the other hand, the heretofore used stationary cutting tool is situated several feet from the welding point and the cutting resistance of the internal weld bead is great because the internal weld bead is in a state of low temperature about 200°–300°C in the case of steel. In this invention, the object of removing the internal weld bead at high temperature is to minimize the cutting resistance. As the cutter is rotary, each edge alternately cuts the bead and the edges are kept in state of low temperature. For this reason the edges of the cutter are subjected to little wear.

On the other hand, if the heretofore used stationary cutting tool cuts the internal weld bead at high temperature, the temperature of the edge will soon rise to a high level because the edge constantly contacts the internal weld bead at high temperature, then the edge cannot withstand it and will abruptly be destroyed.

In this way this invention solves the problems which the heretofore used means could not overcome, and makes a great contribution to tube making. These and other objects of the invention not specifically set forth above will become readily apparent from the accompanying description and drawings in which:

FIG. 2 is a plan view of a internal weld bead cutting apparatus embodying the present invention;

FIG. 3 is a longitudinal sectional view corresponding to FIG. 2; and

Figure 4:
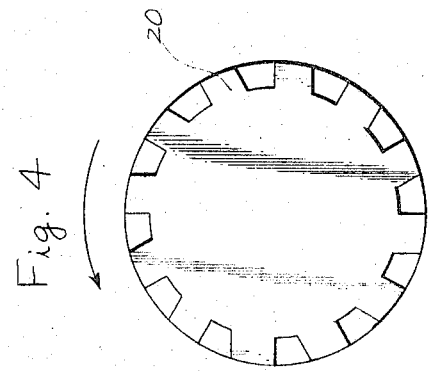
FIG. 4 is a side view of a rotary cutter according to the present invention.
Figure 1:
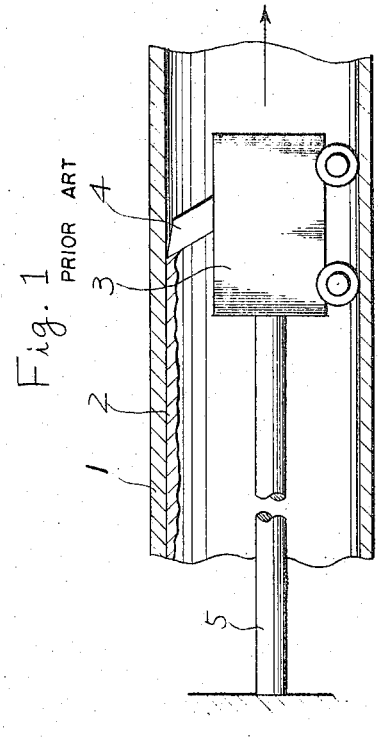
FIG. 1 is a side elevational view showing a construction of the conventionally used internal weld bead cutting apparatus.

As shown in FIG. 2 and 3, the metallic strip which continuously proceeds in the direction of the arrow, is guided by a fin roll 9, heated by a high frequency coil 10, a squeezed by squeeze rolls 8 and becomes welded tube 6. In this way, the continuously created internal weld bead is removed continuously by a rotary cutter 20 which is situated at the welding point or its vicinity.

This rotary cutter 20 is fixed at the end of a rotary shaft 18 which is supported by needle roller bearings 22 and 23, and the rotary cutter 20 rotates with the rotary shaft 18. A coupling 24 is connected with the other end of the rotary shaft 18. This coupling 24 is also connected with a flexible shaft 25, which smoothly rotates in a plastic tube 30 and connected to a driving apparatus 31.

To accommodate the thrust force which works on the rotary cutter 20, a flange 19 is fixed to the rotary shaft 18 and both its sides are supported by thrust metals 21 so that the rotary shaft 18 may have limited axial movement within the clearance between the flange 19 and the thrust metals 21.

To rotatably hold the rotary cutter 20, and constantly press the cutter 20 at a suitable force to the internal weld bead 7, created constantly in the center of the upper part of the welded tube 6, a holder 12 which has a projected portion through the V-shaped gap of the circular formed metallic strip before both edges are welded, is, mounted on a stationary structure 11 by a pin 13, a spring 15 and a volt 17. The force of collar 16 the spring 15 is regulated by exchanging the collar 16 of a suitable length. The holder 12 is hinged on the pin 13 and pulled upward with the spring 15.

In general tube mills using the high frequency resistance welding method or the high frequency induction welding method, usually an impeder is used to minimize the loss of electic power. In this invention a hollow impeder 28 is used, which is fixed to a sleeve 26 by adhesive.

To cool the hollow impeder 28 and the rotary cutter 20, cooling water is supplied from a port 14 provided in the holder 12 and flows through the clearance between the rotary shaft 18 and the sleeve 26, a hole 27 of the sleeve 26 and the clearance between the hollow impeder 28 and the plastic tube 29, cools the impeder 28, and flows toward the rotary cutter 20.

The operation of the above-mentioned apparatus according to this invention is as follows:

The rotary cutter 20 is rotated by the driving apparatus 31 through the flexible shaft 25, the coupling 24 and the rotary shaft 18. In the vicinity of the welding point of the tube where the internal weld bead is still a high temperature near the melting point of the metal and the cutting resistance is minimum, the rotary cutter 20 removes the internal weld bead 7 of the welded metallic tube 6 which is produced from a metallic strip. The fin roll 9 guides the cylindrically formed metallic strip in correct position. The high frequency coil 10 heats both edges of the metalllic strip. The squeeze rolls 8 press both sides of the cylndrically formed metallic strip and weld both its edges. The rotary cutter 20 is pressed to the internal weld bead 7 and the pressure force is suitably controlled by regulating the force of the spring 15. The rotary cutter 20 rotates at a high speed, and is sufficiently cooled by cooling water which flows through the port 14, the clearance between the rotary shaft 18 and the sleeve 26, the hole 27 of the sleeve 26, the clearance between the hollow impeder 28 and the plastic tube 29 and to the rotary cutter 20. In this way the rotary cutter 20 is scarcely heated in spite of contacting with the internal weld bead of high temperature and constantly removes the internal weld bead in good condition. Usual rotary cutters with pointed edges can be used for the purpose of this invention. As shown in FIG. 4, a flat edged rotary cutter, in this case, is more desirable and durable. In this invention the rotary cutter removes the bead at a high temperature while the cutting resistance is very small, so there is no need to use a rotary cutter having pointed edges.

As above mentioned, according to this invention a rotary cutter is used and removes the internal bead at a high temperature in the vicinity of the welding point without damaging the edges of the rotary cutter. In this way the available cutting period of the rotary cutter is several hundred times longer than that of conventional stationary cutting tools. In this invention the rotary cutter is pressed to the internal weld bead at a suitable force by the device having a spring, so the finished internal surface of the tube is smooth and fine and there is no undercutting or overcutting. This makes the following processes, for instance, drawing, bending or polishing of the tube very favorable.

One of the significant features of this invention is that it is possible to remove the internal weld bead of small tubes, for instance, down to ½ diameter inch, tubing. The reason for this is the cutting resistance of the internal weld bead is very small at high temperature therefore the cutting apparatus can be minimized be reducing the cutting resistance. On the other hand, usually the conventional apparatus with a stationary cutting tool cannot be minimized to adapt to under 1 inch diameter tubes, because the cutting resistance is great and the holding means cannot be made strong enough to sustain the cutting tool.

As above mentioned, this invention has significant advantages, that is, prolonged available cutting period of the cutter, larger range of the tube size from which the internal weld bead is removable. While there is herein described a preferred embodiment of the invention it will be obvious to those skilled in the art that the apparatus is susceptible to many modifications in the design and arrangement of parts within the scope of the appended claims.

I claim:

1. Apparatus for continuously removing a weld bead from the inner surface of a welded metallic tube comprising; means for cylindrically forming a metallic strip and butt welding both edges of said metallic strip, a rotary cutter, said rotary cutter being positioned relative to said means for forming and welding said metallic strip so as to be disposed within the formed tube just beyond the location where the edges are welded together for cutting the internal bead on the inner surface of said tube in the vicinity of the welding point of said tube where the temperature of the weld bead is close to the melting point of the metal, a rotary shaft carrying said rotary cutter at one end thereof, driving means adapted to be connected with the opposite end of said rotary shaft and operating to rotate said rotary shaft at high speed, and means for rotatably supporting said rotary shaft and resiliently pressing said rotary cutter against the internal weld bead of said tube.

2. Apparatus for continuously removing a weld bead from the inner surface of a welded metallic tube comprising; means for cylindrically forming a metallic strip and butt welding both edges thereof, a rotary cutter, said rotary cutter being positioned relative to said means for forming and welding said metallic strip so as to be disposed within the formed tube just beyond the location where the edges are welded together for cutting the internal beah on the inner surface of said tube in the vicinity of the welding point of the tube where the temperature of the weld bead is close to the melting point of the metal, a rotary shaft carrying said rotary cutter at one end thereof and provided with a flange fixedly attached thereto, driving means adapted to be connected with the opposite end of said rotary shaft operative to rotate said shaft at a high speed, supporting means including a stationary structure supporting a holder through a pin and resilient means, said holder and a sleeve screwed to said holder having bearings therein to rotatably support said rotary shaft, said resilient means serving to resiliently press said rotary cutter against the internal weld bead of said tube, said rotary cutter being hinged on said pin through said sleeve, holder and rotary shaft, and thrust metals provided on said holder and being engagable with said flange to limit the axial movement of said rotary shaft, and passage means including a port in said holder, a clearance between said rotary shaft and said sleeve, a hole in said sleeve and a clearance between a hollow impeder and a plastic tube both circumscribing said rotary shaft for supplying coolant to said impeder and said rotary cutter.

3. Apparatus according to claim 1, wherein said driving means is disposed on the outside of said metallic strip to be welded and is connected with the other end of said rotary shaft through a flexible shaft.

4. Apparatus according to claim 2 wherein said hollow impeder is mounted on the sleeve of said supporting means.

5. Apparatus according to claim 1 wherein said rotary cutter is disposed with flat edges spirally extending along the cylindrical surface thereof.

* * * * *